July 24, 1951

G. E. ROWE 2,561,536

GRIPPING AND TRANSFERRING DEVICE
FOR BOTTLES AND THE LIKE
Filed Oct. 24, 1946

INVENTOR
GEORGE E. ROWE

BY Parham + Bates

ATTORNEYS

Patented July 24, 1951

2,561,536

UNITED STATES PATENT OFFICE 2,561,536

GRIPPING AND TRANSFERRING DEVICE FOR BOTTLES AND THE LIKE

George E. Rowe, Wethersfield, Conn., assignor to Emhart Manufacturing Company, a corporation of Delaware Application October 24, 1946, Serial No. 705,371

5 Claims. (Cl. 294—87)

1

This invention relates generally to improvements in the gripping or tong members of stackers and other transferring equipment widely used in industries where a multiplicity of articles must be picked up and transferred from one location to another.

It is an object of this invention to provide a device for gripping the finished portions of bottles, jars and like articles which is capable of self-adjustment to adapt itself to irregularities in the finish portions of such articles.

It is another object of this invention to provide a device for gripping simultaneously a plurality of articles and, more specifically, a plurality in which each individual article does not require exact positioning relative to the gripping device.

A further object of the invention is to provide a device of the character described having gripping means which are self-adjusting to grip simultaneously a plurality of articles having portions to be gripped which may vary in size within limits among themselves and also may be out of transverse alignment at the pick-up station to a limited extent.

It is a still further object of this invention to provide a gripping device which can be easily and quickly adjusted to grip a wide variety of articles of different sizes.

A still further object of the present invention is to provide a device which, in the gripping position, has a minimum of surface contact with the article being gripped or held.

Many devices in current use for picking up and transferring bottles, jars and like articles from conveyors or receiving positions to lehrs or other delivery stations comprise tongs formed from sheet stock or light gauge metal, having V-shaped notches or openings to adapt the tongs to the outside surface or neck finish portion of the article being transferred. As the rate of production in the glass industry and other container industries has increased, it has become increasingly important to devise methods and devices for handling larger numbers of articles in relatively short time periods and, more specifically, to handle a plurality of articles simultaneously. Machines utilizing notched tong type gripping devices, widely known in the art, have been adapted to handle a plurality of articles simultaneously. However, these gripping devices inherently require that the articles to be gripped and conveyed be located with a high degree of accuracy relative to the tong mechanism and failure to so locate the articles may result in

2 malfunctioning of the machine. Furthermore, these notched tongs may contact the articles being conveyed on relatively large areas and thus cause excessive heat transfer from the articles if they be hot, as they may be if delivered directly from a glass forming machine. This excessive rate of cooling from a relatively restricted and localized area will cause internal stresses and in some cases may cause cracks or checks in the finish portions of such articles.

The present invention has been devised to alleviate certain of these difficulties and to provide a solution to the demand for a means of gripping and transferring large numbers of articles in relatively short time periods. An additional requirement that has been met by the present device is that of easy and rapid adjustment to adapt the device to a wide variety of articles having finish portions of different sizes.

Other advantages of the present invention will become apparent or be specifically pointed out with reference to the accompanying drawings, in which.

Figure 1:
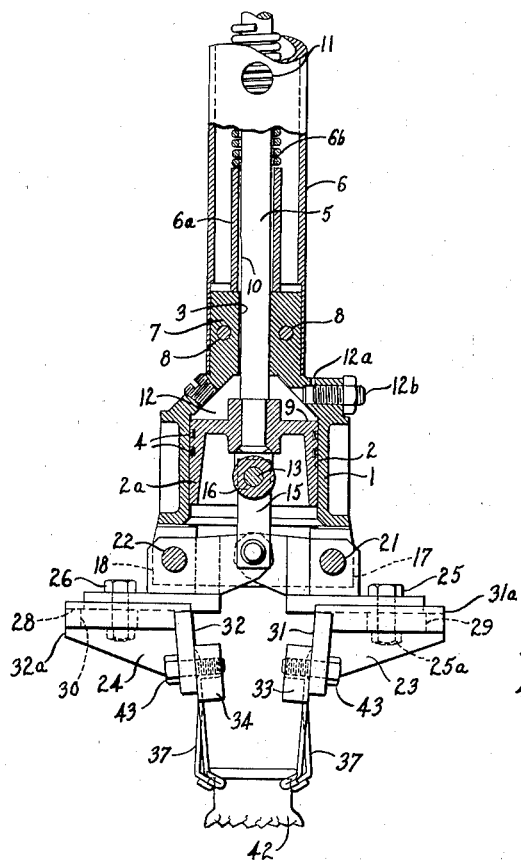
Fig. 1 is a vertical cross-section view of a tong or gripper mechanism showing gripper members, made according to the present invention, in working disposition to the finish portion of an article.

Referring first to Fig. 1, the gripper mechanism consists of a cylindrically shaped body 1, having a cylindrical bore 2 therein and a relatively smaller cylindrical bore 3 concentric with bore 2. Disposed within bore 2 is a piston 2a carrying piston rings 4. Attached to the upper portion of piston 2a is a piston rod 5 of substantial length, extending axially through bore 3. Mounted axially and concentrically around piston rod 5 is a tube 6 fitted closely over an upwardly extending portion 7 of body 1 to which tube 6 may be attached by a plurality of rivets 8 or other conventional fastening members. Concentric within tube 6 and spaced slightly from the lateral surface of rod 5 is a sleeve 6a of relatively short axial length. Seated on the upper end of sleeve 6a is a compression spring 6b, the upper end of which may be fastened by any suitable means (not shown) to the upper end of piston rod 5.

Piston 2a within bore 2 is substantially similar to a conventional piston-cylinder arrangement. Thus, air may be introduced to the upper surface 9 of piston 2a to force the piston downwardly, thereby moving piston rod 5 downwardly and compressing compression spring 6b. Air may be introduced into tube 6 through inlet port 11 in any known manner. A relieved section 10 is provided in a side portion of rod 5 to facilitate the introduction of air to the upper surface 9 of piston 2a. The air within tube 6 travels along the clearance space between sleeve 6a and rod 5 and thence to the relieved portion 10 and into the space 12 above surface 9. Removal of the pressure from space 12 will permit piston 2a and its associated parts to move upward under the action of compression spring 6b. The compressed air within space 12 may vent slowly to the atmosphere through vent 12a the effective flow area of which may be varied by adjustment of screw 12b.

Devices of the type hereinbefore described are well known in the glass industry and have been successfully used in conjunction with stackers of the type disclosed in the U. S. Patent No. 1,878,156 to E. H. Lorenz on September 20, 1932. The details of the means for mounting the gripper mechanism and feeding air to inlet port 11 may be found in this patent to Lorenz and in other related stacker patents.

A pin 13 is mounted transversely across the lower portion or skirt section of piston 2a. Two vertical links 14 and 15 are mounted on pin 13 and spaced laterally from each other by a washer 16 or other suitable means. The lower ends of vertical links 14 and 15 are pivotally attached to pivoted levers 17 and 18, respectively, by pivot pins 19 and 20, respectively. Levers 17 and 18 are pivotally attached intermediately to body 1 by pins 21 and 22, respectively. By means of this linkage system, downward movements of piston 2a under the influence of air pressure in space 12 will cause levers 17 and 18 to pivot about pins 21 and 22, respectively. Gripper brackets 23 and 24 may be adjustably attached to levers 17 and 18, respectively, by means of cap screws 25 and 26 or by any other conventional means.

Gripper bracket 23 may be supplied with a groove 27 which may be proportioned so as to fit closely over the bottom section of lever 17. A similar groove 28 may be formed in bracket 24 to fit on the bottom portion of lever 18. Grooves 27 and 28 facilitate the adjustment of gripper brackets 23 and 24 without the brackets rotating in a horizontal plane.

To facilitate the positioning adjustment of brackets 23 and 24 on the levers 17 and 18, respectively, slots 29 and 30 may be provided centrally disposed longitudinally within grooves 27 and 28, respectively. Cap screw 25 and its associated nut 25a may be loosened slightly and bracket 23 may be moved outwardly or inwardly in a direction parallel to that of groove 27 to give bracket 23 any desired position relative to the vertical axis of the mechanism. Bracket 24 may be similarly positioned.

Figure 3:
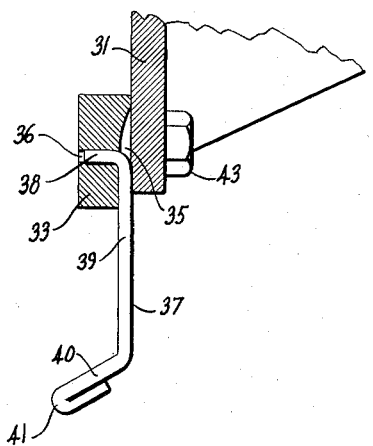
Fig. 3 is a relatively enlarged view of one of the gripper members or fingers clamped in place in its holder.
Figure 2:
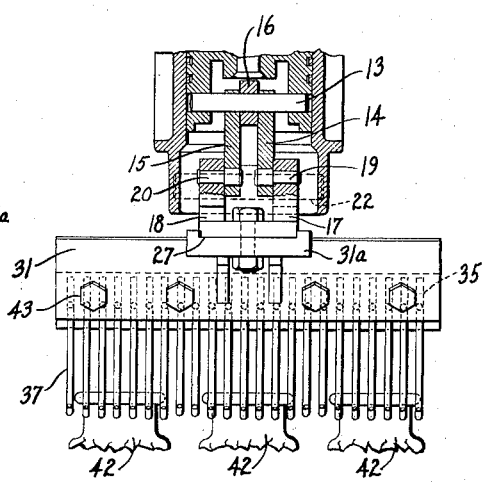
Fig. 2 is a side elevation view of the tong mechanism in working disposition to the finish portions of a plurality of articles.

As shown in Fig. 2, lower flat portions 31 and 32 of brackets 23 and 24, respectively, may be made substantially long relative to the width of the upper attaching portions 31a and 32a, respectively, of these brackets. Attached to portions 31 and 32 of the gripper brackets are gripper bars 33 and 34, respectively. The gripper bars may be rectangular in cross-section as shown in Figs. 1 and 3 and may be provided with a plurality of parallel, regularly spaced grooves 35 (Fig. 3) on one face thereof transverse to the longitudinal axis of the bar. A plurality of holes 36 may be provided in the gripper bars intersecting the plurality of grooves 35. Clamped between gripper bars 33 and 34 and portions 31 and 32 of the gripper brackets, respectively, are sets of gripper fingers 37. One end 38 of each gripper finger may be bent to form a right angle with body portion 39 of the gripper finger and may be introduced into one of the holes 36. Vertical body portion 39 of each gripper finger may then be partially disposed in one of the grooves 35. The disposition of each gripper finger in one of the holes 36 and one of the associated grooves 35 will effectively restrain any movement at the secured end of the finger relative to its holder which comprises a bar 33 or 34 and the associate bracket 23 or 24. Lower end 40 of each gripper finger may be bent to form an obtuse angle with the main body portion 39. Part of the angularly disposed end 40 may be bent 180° and may be formed to be immediately adjacent to angular portion 40. In this way, a rounded contact end portion 41 may be provided on the lower end of each gripper finger. The gripper bars may be attached to the lower portions of the gripper brackets by any conventional fastening means, as by cap bolts 43.

As shown in Figs. 1 and 2, a plurality of gripper fingers may be assembled to the gripper mechanism in such a fashion that the angularly displaced ends extend toward a vertical plane in which the vertical axis of the gripper mechanism lies. The gripper fingers depend vertically and are spaced apart from each other as shown in Fig. 2, sufficient gripper fingers being provided to grip or grasp a plurality of articles 42 by their finish portions.

As levers 17 and 18 pivot about pins 21 and 22, respectively, in response to the movements of piston 2a and its associated linkage mechanism, gripper brackets 23 and 24, respectively, will be swung about the pivot pins 21 and 22 by their supporting and operating levers 17 and 18. The swinging movement of the gripper brackets will move the sets of opposed gripper fingers inwardly and outwardly toward and away from each other. As these opposed fingers approach the vertical plane at the center of the mechanism from both sides they will come into working disposition with a plurality of articles which are suitably disposed to be picked up by the gripper mechanism.

A downward movement of piston 2a under the influence of air pressure in space 12 will cause opposed gripper fingers to separate or swing apart. When the air pressure is released from space 12, piston 2a and its associated linkages will move upward under the influence of spring 6b. This will cause the sets of gripper fingers to swing toward each other and two or more adjacent opposed pairs of fingers to grip or grasp each article that is located therebetween.

During the gripping operation, the gripper fingers will spring slightly to conform to any irregularities that may be present in the finish portion of the articles (Fig. 1). This springing action will not only adapt the gripper fingers to the finish portions of the articles but will also make it possible to grip the articles regardless of their position along a transverse line running parallel to the gripper bars and passing through the articles at the pick-up station.

Thus, it will be noted that the herein disclosed invention provides self-adjusting, flexible means for gripping a plurality of articles simultaneously. It is also to be noted that the use of the present invention will obviate the necessity for positioning the articles to be grasped with a high degree of accuracy. Conventional means (not shown) may be provided to limit the uppermost position of piston rod 5 and thus limit the minimum operating distance between the sets of opposed gripper fingers. By suitable adjustment of the gripper brackets relative to the pivoted levers 17 and 18, the spacing transversely between the sets of gripper fingers may be varied and the mechanism adapted to handle articles of a wide variety of sizes. This will be of particular advantage in container factories where bottles and jars and like articles of a variety of sizes are manufactured and must be picked up and conveyed from one place to another.

It is recognized that the shape that the gripper fingers are formed to may vary greatly and still accomplish substantially the same result as the particular embodiment herein disclosed. It is also recognized that a wide variety of conventional means may be used to attach the gripper fingers to the gripper brackets.

The gripper fingers may be made from stainless steel, as in the present embodiment, or may be made from any material in any cross-sectional form having the requisite degree of flexibility and durability. If articles are conveyed while at a high temperature, the small area of contact between rounded contact surfaces 41 and the articles will minimize the amount of cooling of the articles. The reduction in the amount of cooling will tend to minimize or obviate the attendant internal stresses within the articles and will tend to eliminate the cracks that often result from such stresses.

The present device has been illustrated with reference to three articles to be conveyed. It should be recognized, however, that the longitudinal extent of portions 31 and 32 of the gripper brackets may be relatively great and may be sufficient to carry sets of enough gripper fingers to grip and transfer simultaneously a large number of articles. The longitudinal extent of the gripper brackets may, however, be limited to pick up articles individually if desired.

The herein disclosed invention has been described with reference to a particular preferred embodiment but it is desired that the invention encompass all variations and modifications thereof within the spirit and scope of the invention as pointed out in the appended claims.

I claim:

1. In a mechanism for picking up and transferring a row of upright bottles, jars or like articles from a pick-up station to a delivery station, a bodily movable support, means pivotally to suspend a pair of transversely spaced cooperative rows of transversely aligned closely adjacent, elongate spring gripper fingers from said movable support so that the individual elongate gripper fingers of each row are fixed in relation to one another at their upper ends only and each otherwise is free to flex laterally in any direction under pressure against its lower end, and actuating means carried by said movable support to actuate the means pivotally to suspend the rows of gripper fingers to swing said rows in unison relative to said support toward each other sufficiently to cause cooperative opposed gripper fingers of the two rows to be flexed by contact with interposed portions of individual articles of a row of articles at the pick-up station so that all such articles will be firmly gripped by cooperative fingers of the two rows in contact therewith even though the portions of the different articles gripped by said rows of fingers vary among themselves in size or contour within limits and the individual articles are not exactly in line or spaced uniformly apart in the row at the pick-up station, said actuating means also being operable to swing the rows of gripper fingers apart to release the previously gripped articles so as to deposit them in a straight line at the delivery station, said means pivotally to suspend said pair of cooperative rows of gripper fingers from said movable support comprising a pair of levers pivotally mounted on said support to swing about spaced parallel horizontal axes, brackets mounted on said levers to swing therewith and to be adjustable thereon toward and away from each other, and means releasably to secure the upper ends of said rows of spring gripper fingers to said brackets.

2. A mechanism as recited in claim 1 wherein said means releasably to secure the upper ends of said rows of spring gripper fingers to said brackets comprises bars fitting against adjacent lateral faces on the brackets and detachably secured thereto, said bars having closely spaced vertical grooves in their inner faces and holes intersecting said grooves and the upper ends of said fingers extending in said grooves and having their upper extremities bent into said holes so as to be firmly clamped to the brackets by said bars.

3. In a mechanism for picking up and transferring a row of upright bottles, jars or like articles from a pick-up station to a delivery station, a bodily movable support, a pair of horizontally disposed, elongate gripper finger holders pivotally suspended from said support for relative transverse swinging movements toward and away from each other, a pair of rows of generally upright elongate flexible spring gripper fingers individually held rigidly by their upper ends only by their holders to depend from said holders so that the lower ends of the fingers of the two rows will be swung toward and away from each other by like swinging movements of the holders, each finger being free from its lower extremity upward for the major part of its length to flex laterally in any direction under pressure against its lower end, the fingers of each row being numerous and close to one another in the row so that a plurality of pairs of opposed fingers of the two rows will be closed to grip each article of a row of articles at the pick-up station when such rows of fingers have been swung by their holders toward each other sufficiently to press the free lower ends of opposed fingers against the interposed portions of the articles to be gripped, the inherent resiliency of the lower portions of the opposed fingers serving to maintain them in contact with such articles while permitting independent limited lateral flexure of the lower end of each such finger in any direction under pressure, whereby all the articles of the row at the pick-up station will be gripped by opposed fingers of the two rows for simultaneous transfer even though the interposed gripped portions of the individual articles of said row vary among themselves in size or contour within limits or are not exactly in line or spaced uniformly apart in the row at the pick-up station.

4. A mechanism as recited in claim 3 wherein the individual spring gripper fingers of the two rows have substantially straight main body portions extending from their rigidly held upper ends for a substantial part of their length and then are bent to extend at an obtuse angle with their main body portions for the remainder of their length to their lower ends, the two rows of fingers being held by their respective holders so that the angularly disposed lower end portions of the component fingers of each row are turned toward the corresponding portions of the fingers of the other row.

5. A mechanism as recited in claim 3 wherein the lower end portions of the fingers of the two rows held by said holders are bent at an angle with their remaining portions to extend toward each other and are formed with convex surfaces of small contact area at their proximal ends.

GEORGE E. ROWE.

REFERENCES CITED

The following references are of record in the file of this patent:

UNITED STATES PATENTS

| Number | Name | Date |
|---|---|---|
| 197,135 | Hunting | Nov. 13, 1877 |
| 832,087 | Scoggins | Oct. 2, 1906 |
| 851,631 | Swanson | Apr. 23, 1907 |
| 883,563 | Parrish | Mar. 31, 1908 |
| 1,493,480 | De Tour | May 13, 1924 |
| 2,072,826 | Riley | Mar. 2, 1937 |
| 2,277,828 | Morgan | Mar. 31, 1942 |